United States Patent [19]

Christopher

[11] 4,121,849
[45] Oct. 24, 1978

[54] STABILIZER FOR ARTICLES CARRIED WITHIN A VEHICLE BED

[76] Inventor: Robert E. Christopher, 1014 Walnut St., Gadsden, Ala. 35901

[21] Appl. No.: 819,663

[22] Filed: Jul. 28, 1977

[51] Int. Cl.² .............................................. B60P 7/00
[52] U.S. Cl. ................................................ 280/179 R
[58] Field of Search .................... 280/179 R; 248/500, 248/503, 507; 105/486

[56] References Cited

U.S. PATENT DOCUMENTS

| | | | |
|---|---|---|---|
| 2,697,631 | 12/1954 | Miller | 280/179 R |
| 2,770,471 | 11/1956 | Scott | 280/179 R |
| 2,885,221 | 5/1959 | Weeks | 280/179 R |

Primary Examiner—Robert R. Song
Attorney, Agent, or Firm—Woodford R. Thompson, Jr.

[57] ABSTRACT

A stabilizer for articles carried within a vehicle bed embodying an elongated support member extending transversely of the vehicle bed and attached thereto. A movable member beneath the support member is of a length to move inwardly of the bed and across the articles carried therein. A pair of actuators carried by the elongated support member are adapted for longitudinal movement toward and away from each other. A link is pivotally connected at one end to each actuator with its other end pivotally connected to the movable member so that upon movement of the actuators in one direction relative to each other the movable member is moved away from the article within the vehicle bed and upon movement of the actuators in the other direction relative to each other the movable member is moved toward the article to stabilize the same.

4 Claims, 8 Drawing Figures

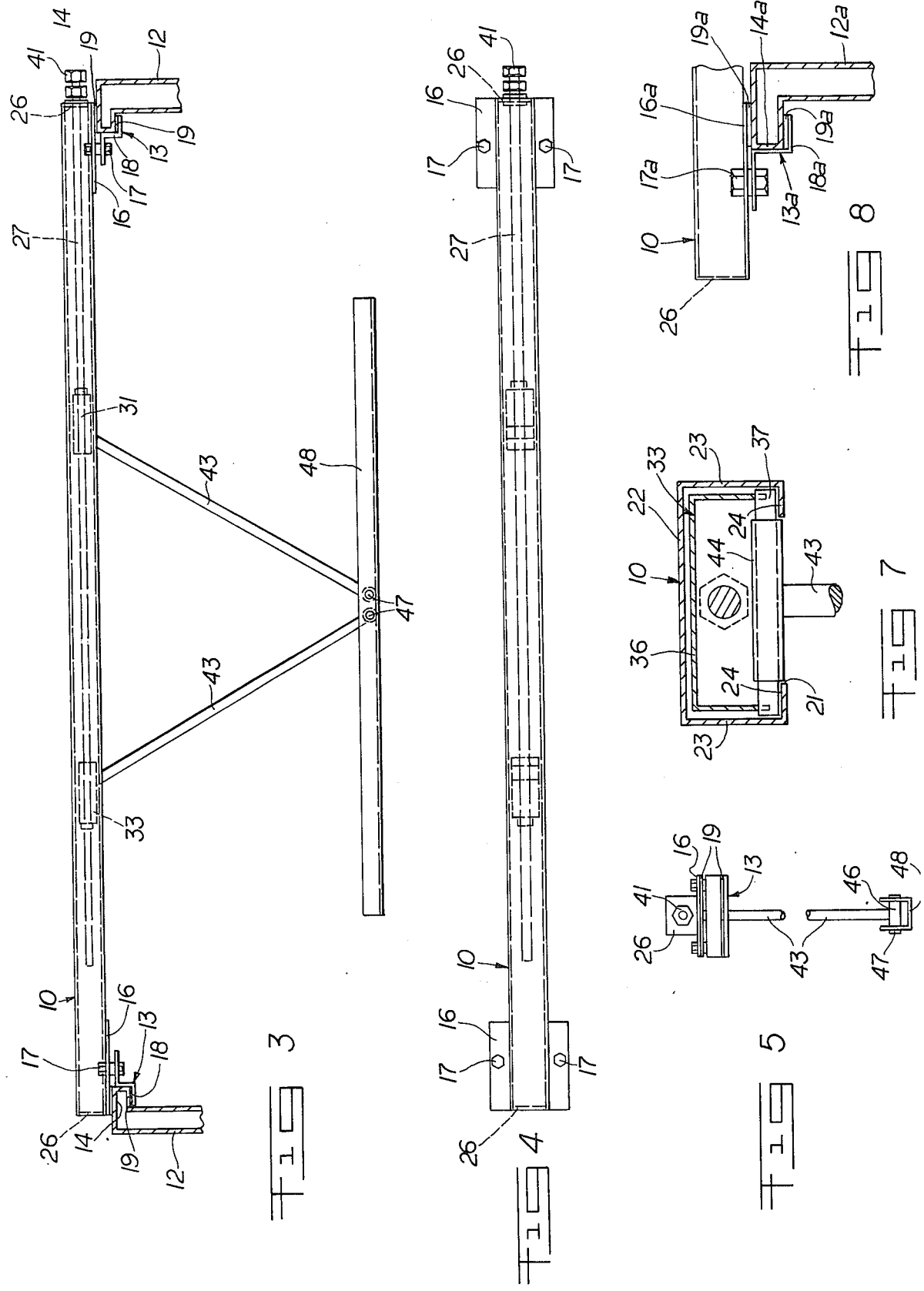

STABILIZER FOR ARTICLES CARRIED WITHIN A VEHICLE BED

BACKGROUND OF THE INVENTION

This invention relates to a stabilizer for articles carried within a vehicle bed and more particularly to such a stabilizer which may be detachably connected to the bed of a vehicle, such as a pick-up truck, whereby articles carried therein may be secured in place regardless of the shape or size of the articles.

Heretofore in the art to which my invention relates, difficulties have been encountered in stabilizing articles carried in the open bed of pick-up trucks due to the fact that such articles are often longer than the bed of the truck and also such articles vary in size and shape whereby it is difficult to retain such articles in a fixed position within the bed of a vehicle. This is especially true due to the fact that the upper surface of such articles are not always at the same elevation and the upper surface of the articles are often below the upper edges of the side walls for the vehicle bed.

SUMMARY OF THE INVENTION

In accordance with my invention, I provide a stabilizer for articles carried within a vehicle bed which embodies an elongated support member which extends transversely of the vehicle bed and is attached thereto. A movable, hold-down member is mounted beneath the support member and is of a length to move inwardly of the vehicle bed and across the articles carried therein. Actuators are mounted for longitudinal movement along the elongated support member in directions toward and away from each other. A link member is pivotally connected at one end to each actuator while the other end of the link is pivotally connected to the movable member which engages the article or articles carried within the vehicle bed whereby upon movement of the actuators in one direction relative to each other the movable member is moved away from the articles within the vehicle bed and upon movement of the actuator members in the other direction relative to each other the movable member is moved toward the articles to thereby stabilize the articles within the vehicle bed. Preferably, the lower ends of the link-like members are pivotally connected to the movable member adjacent the longitudinal center thereof whereby the movable member is adapted to pivot to selected positions relative to the vehicle bed. Accordingly, where the upper surface of an article at one side of the vehicle bed is at an elevation above another article at the other side of the vehicle, the movable, hold-down member will pivot to a position whereby the portion at one side of its pivotal connection will engage the upper surface of the article which is at a higher elevation while the portion of the movable hold-down member at the other side of the pivotal connection will move to a lower elevation to engage the upper surface of the articles which are at a lower elevation. Also, where articles are positioned at only one side of the vehicle bed, the movable hold-down member will pivot about its pivotal connections whereby the end of the movable member opposite the end thereof engaging the articles will engage the floor of the vehicle bed. Accordingly, one or more articles may be stabilized within the vehicle bed with a minimum of effort. Any articles smaller than the articles engaged by the movable, hold-down member would be retained in place between the articles which extend to a higher elevation or between such articles and the side walls of the vehicle bed.

DESCRIPTION OF THE DRAWINGS

Stabilizer apparatus embodying features of my invention is illustrated in the accompanying drawings, forming a part of this application, in which:

FIG. 1 is a perspective view showing my improved stabilizer mounted on the bed of a vehicle in position to stabilize a load consisting of boards of lumber or the like;

FIG. 3 is an enlarged, side elevational view showing fragments of the upper side walls of a vehicle bed and the means for attaching the stabilizer to such side walls;

FIG. 4 is a top plan view of the apparatus shown in FIG. 3, the side walls of the vehicle bed being omitted, for the sake of clarity;

FIG. 5 is an end view looking from the right side of the stabilizer shown in FIG. 4, partly broken away;

FIG. 7 is a sectional view taken generally along the line 7—7 of FIG. 6, partly broken away; and, FIG. 8 is a fragmental view corresponding to the left side of the apparatus shown in FIG. 3 but showing a modified form of clamp for attaching the stabilizer to the side wall of a vehicle bed having outturned upper portions rather than inturned, upper portions, as shown in FIG. 3.

DETAILED DESCRIPTION

Figure 6:
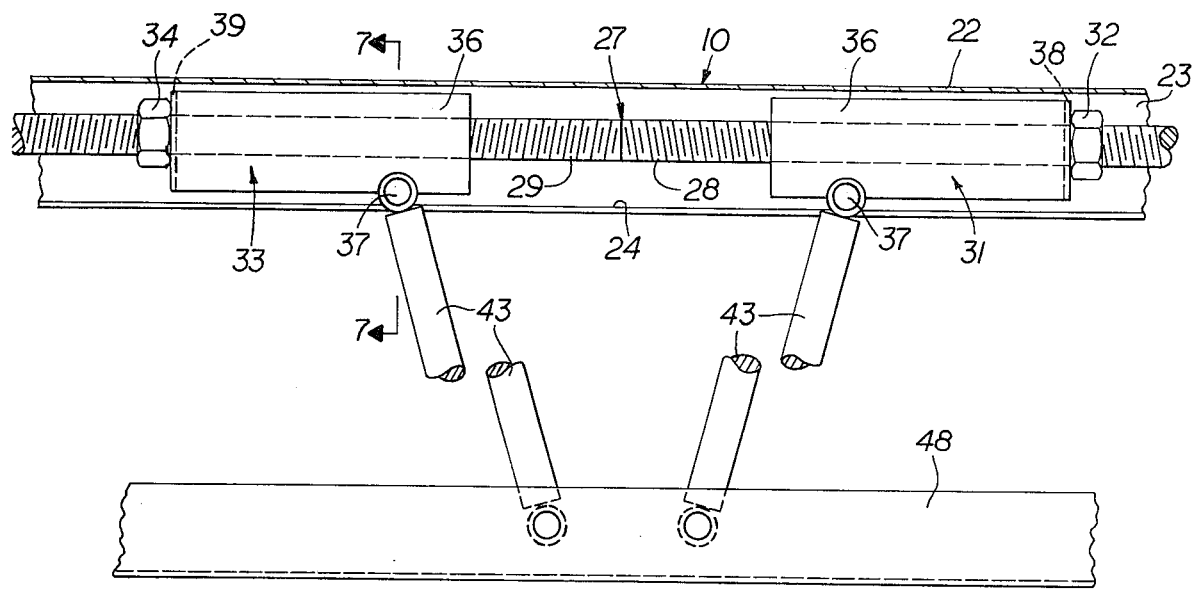
FIG. 6 is an enlarged, fragmental view, partly broken away and in section, showing the mechanism for moving the movable hold-down member selectively to operative and inoperative positions.

Referring now to the drawings for a better understanding of my invention I show an elongated support member 10 which is of a length to span the bed 11 of a vehicle, such as a pick-up truck or the like. The ends of the elongated support member 10 are detachably connected to the upper portions of the side walls 12 of the vehicle bed 11 by suitable clamps. In FIG. 3 of the drawings, I show clamp members 13 for attaching opposite ends of the elongated member 10 to upper, inturned portions 14 of the side walls 12 of a vehicle bed. The clamp 13 is shown as comprising an upper, flat section 16 which is secured rigidly to end portions of the elongated support member 10 by suitable means, such as by welding. Detachably connected to the upper section 16 by suitable retaining bolts 17 is a lower, Z-shaped member 18 having a horizontally extending lower portion which fits beneath the inturned portion 14 of the side wall 12, as clearly shown in FIG. 3. Suitable resilient pads 19 are carried by the undersurface of the flat members 16 and the upper surface of the lowermost flange of the Z-shaped members 18 which fits beneath the inturned portion 14 of the side wall 12. Accordingly, upon tightening the bolts 17, the resilient pads 19 are compressed to firmly secure the ends of the elongated support member 10 to the side walls 12 of the vehicle bed 11.

In FIG. 8 of the drawings, I show a modified form of clamps 13a which also includes an upper flat section 16a and a Z-shaped member 18a having a lower flange which is adapted to extend beneath an outturned portion 14a of a vehicle side wall 12a. That is, the upper portion of the vehicle side wall 12a turns outwardly of the vehicle bed rather than inwardly as shown in the embodiment shown in FIG. 3. Suitable retaining bolts 17a attach the elements 16a and 18a to each other whereby the elongated support member 10 is detachably connected to the side walls of the vehicle bed. Also, suitable resilient pads 19a are carried by the under surface of the plate member 16a and the upper surface of the lowermost flange of the Z-shaped clamp element 18a, as shown.

While I have shown two clamping assemblies for attaching the ends of the elongated support member 10 to the upper portions of the side walls 12 of the vehicle bed 11, it will be apparent to those skilled in the art that other suitable means may be employed for detachably connecting the elongated support member 10 to the vehicle bed.

Figure 2:
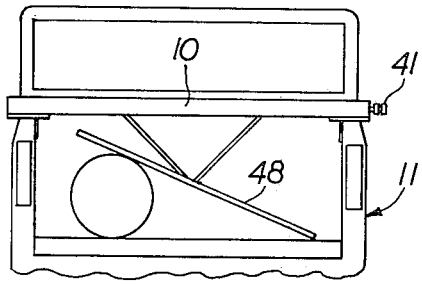
FIG. 2 is a rear elevational view of a vehicle bed showing my improved stabilizer engaging a cylindrical article carried at one side of the vehicle bed, with the other side of the vehicle bed being empty.
Figure 1:
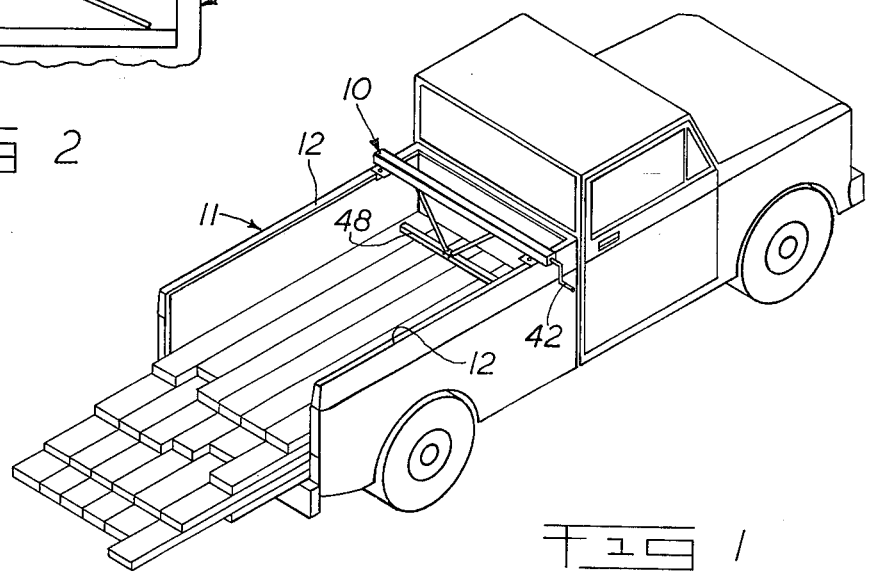

As shown in FIG. 7, the elongated support member 10 is generally tubular in shape and is provided with a longitudinally extending opening 21 in the lower side thereof, as shown in FIG. 7. Preferably, the elongated support member 10 is a generally channel-shaped member having a web 22 formed integrally with depending flanges 23 with the lower edges of the flanges being turned inwardly to define horizontally extending supporting surfaces 24 adjacent the longitudinally extending opening 21. The ends of the elongated support members 10 are closed by transverse plates 26. Extending through a suitable opening 10 is an elongated threaded member 27. As shown in FIG. 6, the elongated threaded member 27 is provided with righthand threads 28 over one-half of its length and lefthand threads 29 over the other half of its length. An actuator member 31 carrying a nut 32 is threadedly connected to the righthand threaded section 28 and an actuator 33 carrying a nut 34 is threadedly connected to the lefthand threaded section 29 whereby upon rotation of the elongated threaded member 27 in opposite directions, the actuator 31 and 33 move toward and away from each other to selected positions. Each of the actuators 31 and 32 comprises a channel-like member 36 having depending flanges. Secured to the depending flanges of the channel-like member 36 is a trnasverse rod 37 which is adapted to ride on the supporting surfaces 24 carried by the elongated support member 10, as clearly shown in FIGS. 6 and 7. Extending transversely of and secured to the outermost ends of the channel-like members 36 are transverse plates 38 and 39 which are in turn rigidly secured to the nuts 32 and 34, respectively. As shown in FIGS. 2, 3 and 4, a tool-engaging member in the form of a nut 41 is secured rigidly to the end of the elongated threaded member 27 projecting outwardly of the plate 26 for receiving a rotary power unit, such as a crank 42 shown in FIG. 1. It will be apparent that other suitable means may be employed for rotating the nut 41 and the threaded shaft 27 connected thereto.

Pivotally connected to each transverse rod 37 carried by the actuators 31 and 33 is one end of an elongated link-like member 43. As shown in FIG. 7, the upper ends of each link 43 carries a sleeve-like member 44 which receives the rod 37 whereby each link-like member 43 is adapted for free pivotal movement relative to the actuator 31 or 33, as the case may be.

The other or lower end of each link-like member 43 carries a sleeve member 46 which receives a transverse pin 47 that extends through suitable openings provided in an elongated movable member 48, which is shown as being a channel-like member having upwardly extending flanges, as clearly shown in FIG. 5. As shown in FIGS. 2, 3 and 6, the lower ends of the link-like members 43 are pivotally connected to a central portion of the elongated movable member 48 whereby the movable member 48 is adapted for pivotal movement relative to the link-like members 43 to selected positions, as shown in FIG. 2. That is, the elongated movable member 48 may extend in a generally horizontal direction to hold down or stabilize a load which extends in a generally horizontal plane. On the other hand, where a single article is carried in the vehicle bed 11, one end of the movable member 48 is adapted to pivot upwardly and engage the upper surface of the article whereby the other end thereof would engage the floor of the bed 11. Accordingly, where articles of various sizes are placed in the vehicle bed 11, the movable member 48 would automatically pivot to a proper position whereby the lower surface thereof would firmly engage the subjacent article carried by the vehicle bed. The elongated movable member 48 is thus of a length to move inwardly of the vehicle bed 11 and engage articles of various sizes positioned therein regardless of the elevation of the upper surfaces of the articles. It will be apparent that any article smaller than the articles engaged by the movable member 48 would be retained in place between the larger size articles whereby they would thus be stabilized. It will thus be seen that upon movement of the actuator members 31 and 33 in one direction relative to each other the movable member 48 is moved away from the articles carried within the vehicle bed and upon movement of the actuator members 31 and 33 in the other direction relative to each other the movable member 48 is moved toward the articles carried within the vehicle bed to thus stabilize the articles.

From the foregoing description, the operation of my improved stabilizer will be readily understood. The elongated support member 10 is attached to the upper portion of the vehicle bed 11 by suitable clamp means, such as the clamps 13 and 13a whereby the elongated support member 10 is rigidly secured in place. The movable member 48 may be retracted to a position adjacent the elongated support member 10 when no load is carried within the vehicle bed 11 or when the device is not in use whereby it would take up a minimum of space. After positioning an article or articles within the vehicle bed 10, the crank member 42 is rotated in the proper direction to move the actuators 31 and 33 toward each other whereupon the movable member 48 moves downwardly into firm engagement with the article or articles carried within the vehicle bed 11. Where the upper surface of the uppermost articles positioned in the vehicle bed all extend in the same horizontal plane, the movable member 48 would extend in a horizontal plane and thus exert a downward force on the articles to thereby retain them firmly in place. On the other hand, when articles of different sizes are placed in the vehicle bed or where a single article is placed therein, the movable member 48 would pivot to a proper position to firmly engage the uppermost surfaces of the articles positioned beneath the movable member 48. Where a single article is positioned at one side of the vehicle, the movable member 48 would pivot to the position shown in FIG. 2 whereby the portion of the movable member 48 at one side of its pivot point would engage the upper surface of the article while the other end of the movable member would engage the floor of the vehicle bed 11.

From the foregoing, it will be seen that I have devised an improved stabilizer for articles carried within a vehicle bed. By providing means which may be quickly and easily attached to a vehicle bed, the apparatus may be employed only when it is desired to hold down a load positioned within the bed. By providing a movable member 48 which is adapted to move toward and alongside the elongated support member 10, the apparatus may be stored or shipped while in the collapsed position to thereby take up a minimum of space. Also, by providing power actuated means for moving the actuators 31 and 32 toward or away from each other, the movable member may be readily moved from its upper inoperative position to its lower operative position with a minimum of effort. Furthermore, by providing a movable member 48 which is pivotally connected adjacent its central portion to the elongated link-like members 43, the movable member 48 is adapted to move automatically to the proper position to accommodate the upper surfaces of the articles placed within the vehicle bed 11 and at the same time any smaller size articles positioned between larger size articles are confined between the larger size articles and the lower surface of the movable member 48.

While I have shown my invention in but two forms, it will be obvious to those skilled in the art that it is not so limited, but is susceptible of various other changes and modifications without departing from the spirit thereof.

What I claim is:

1. A stabilizer for an article carried within a vehicle bed having upstanding walls, comprising:
   (a) an elongated support member extending transversely of said vehicle bed and over at least one article carried therein,
   (b) means for attaching said elongated support member to said vehicle bed,
   (c) a movable member beneath said support member of a length to move inwardly of said vehicle bed and extend across said article carried within said vehicle bed,
   (d) a pair of actuator members carried by said elongated support member and adapted for movement longitudinally of said elongated support member toward and away from each other to selected positions, and
   (e) an elongated link-like member pivotally connected adjacent one end to each of said actuator members with the other end of each said link-like member being pivotally connected to a central portion of said movable member so that upon movement of said actuator members in one direction relative to each other said movable member is moved away from said article carried within said vehicle bed and upon movement of said actuator members in the other direction relative to each other said movable member is moved toward said article carried within said vehicle bed to stabilize said article.

2. A stabilizer as defined in claim 1 in which said elongated support member is a tube-like member having a longitudinally extending opening in the lower side thereof for receiving said elongated link-like members.

3. A stabilizer as defined in claim 2 in which said tube-like member is a generally channel-shaped member having a web member formed integrally with depending flanges with the lower edges of said flanges being turned inwardly to define supporting surfaces for said actuator members.

4. A stabilizer as defined in claim 1 in which said movable member extending transversely of said vehicle bed comprises an elongated channel-like member having a web member formed integrally with upstanding flanges with said other end of each said link-like member being pivotally connected to said upstanding flanges so that said elongated channel-like member is adapted for pivotal movement relative to said link-like members to selected positions to accommodate articles of various shapes and sizes.

* * * * *